March 14, 1944.　　　R. E. POWELL　　　2,343,998
WELDING APPARATUS
Filed Dec. 5, 1942　　　2 Sheets-Sheet 2
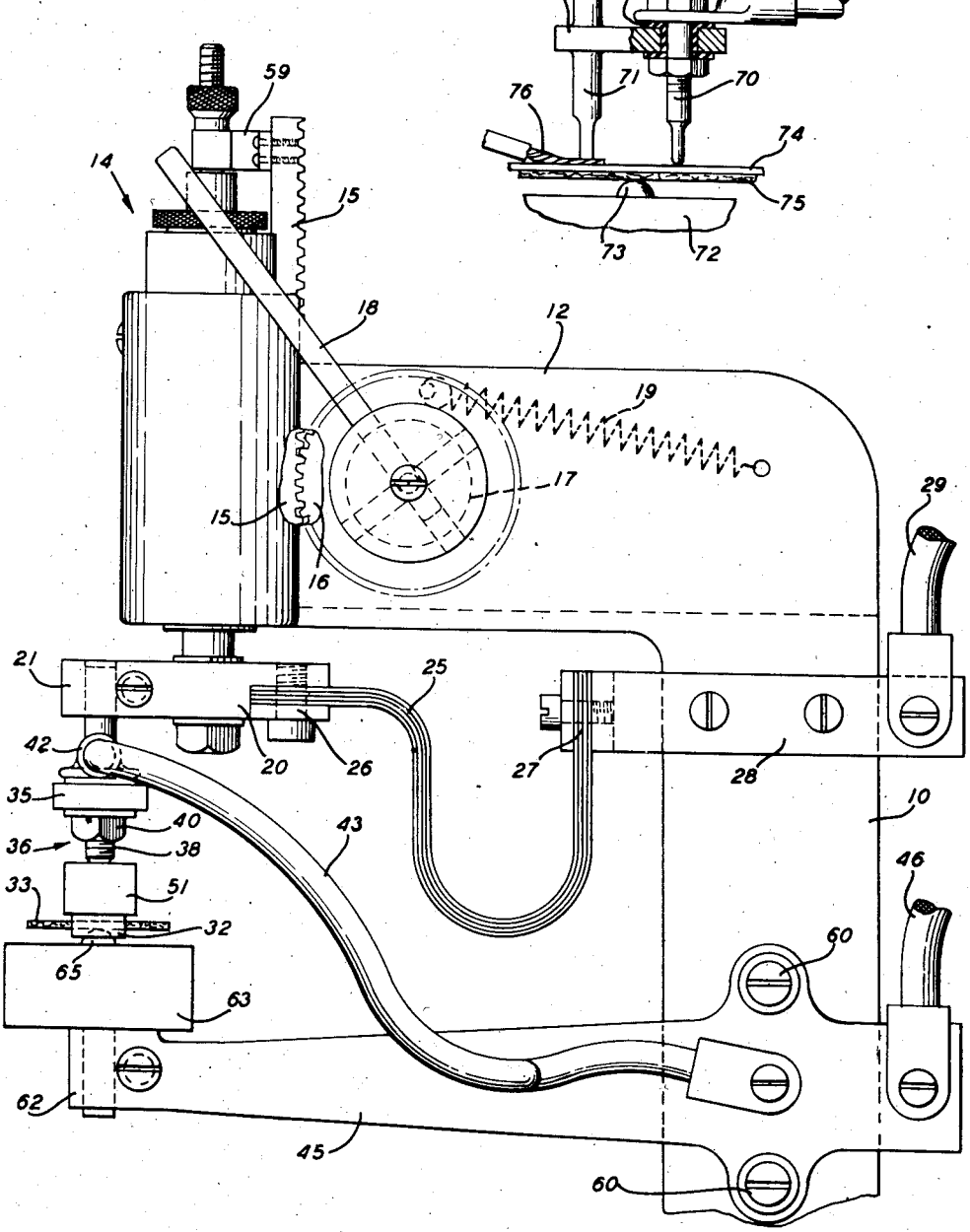
INVENTOR
R.E. POWELL
BY
E.R. Moulton
ATTORNEY Patented Mar. 14, 1944

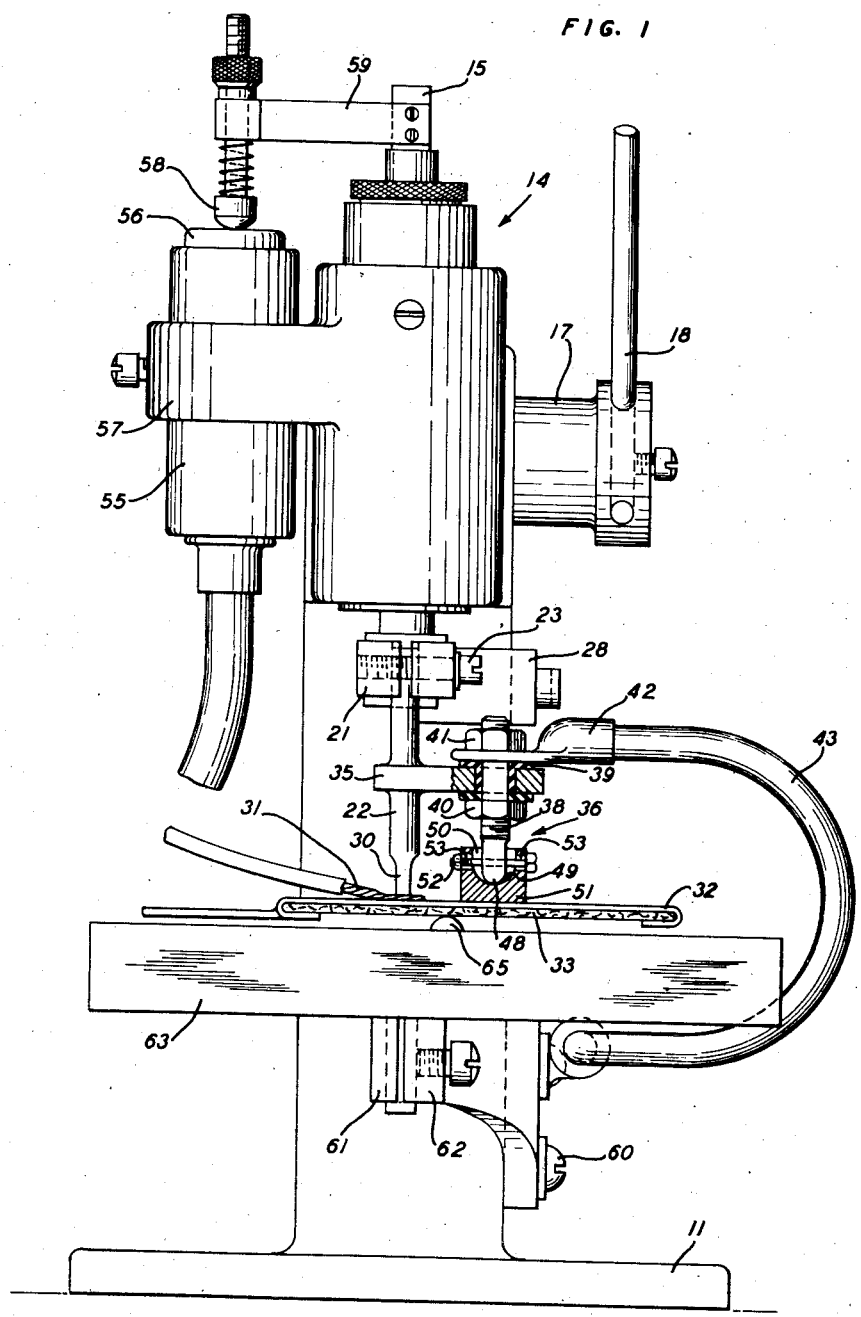

2,343,998

UNITED STATES PATENT OFFICE 2,343,998

WELDING APPARATUS

Raymond E. Powell, Westfield, N. J., assignor to Western Electric Company, Incorporated, New York, N. Y., a corporation of New York Application December 5, 1942, Serial No. 467,942

4 Claims. (Cl. 219—4)

This invention relates to welding apparatus, and more particularly those of the spot welding type.

In the more common spot welding apparatus the work pieces are squeezed between upper and lower electrodes so that the welding current enters the weld-area from an electrode on one side, travels through the weld-area and leaves through the electrode on the other side. Such an arrangement, however, could not be employed if there existed one or more layers of non-current carrying material positioned so that the current could not pass through the assembly.

An object of the invention is to provide a welding apparatus particularly adapted for welding metal parts together in an assembly wherein non-conductive parts are present.

With this and other objects in view, the invention comprises a welding apparatus including electrodes disposed at a common side of an assembly, including metal parts which are to be welded together, and means to support the assembly in a balanced condition for the application of equal pressure through both electrodes to the assembly.

Other objects and advantages will be apparent from the following detailed description when considered in conjunction with the accompanying drawings, wherein Fig. 1 is a front elevational view of the welding apparatus, portions thereof being shown in section;

Fig. 2 is a side elevational view of the welding apparatus, portions thereof being broken away, and Fig. 3 is a fragmentary detail view of another species of the invention.

Referring now to the drawings, attention is first directed to Figs. 1 and 2, which illustrate the apparatus as having a supporting frame 10 with a base 11 and a hollow forwardly projecting portion 12, to support the head structure indicated generally at 14.

The head structure 14 includes a rack 15 which interengages a pinion 16, the latter being mounted upon a shaft 17 which is rotatable through a handle 18 and normally urged in a clockwise direction (Fig. 2) through the aid of a spring 19 or other suitable means. At the lower end of the head 14, a mounting unit 20 is secured and has a clamping portion 21 for the rigid clamping of an electrode 22 therein, through the aid of a screw 23, this structure being at the forward portion of the unit 20. At the rearward portion of the unit 20, conductors 25 are connected, as at 26, the opposite ends of these conductors being clamped, as at 27, to a terminal 28 through which a connection 29 is made with the welding circuit (not shown).

Returning now to the electrode 22, it will be observed that it has a contact point or portion 30 for engaging a part such as a lead 31 for the welding of this part to another part 32. The part 32 is formed with a non-conductive material 33 which would block the flow of a welding current directly through the assembly including the parts 31 and 32. Therefore, the second electrode must of necessity be positioned in engagement with the part 32 as close as is conveniently possible to the part 31. To accomplish this purpose, a supporting arm 35, which in the present instance is formed integral with the electrode 22, extends laterally therefrom as illustrated in Fig. 1, for the purpose of supporting an electrode indicated generally at 36. The electrode 36 includes a vertical portion 38 threaded for the greater portion of its length and extending through an insulating bushing 39 in an aperture of the arm 35. Through the bushing 39, the electrode structure 36 is insulated from the electrode 22. The portion 38 is secured in place through the aid of nuts 40 and 41, the latter serving also for the mounting of a terminal 42 which is electrically connected to a conductor 43. The conductor 43 is included in the welding circuit through a portion of a supporting bracket 45 and a lead 46. The lower portion of the threaded member 38 of the electrode 36 is rounded, as at 48, to cooperate with a concaved end 49 of a cavity 50 in an engaging member 51 of the electrode, to form a universal connection between these portions. A bolt 52 or other suitable means carried by the member 38 and having its ends disposed in enlarged or elongate apertures 53, will permit movement of the portions of the electrode into and out of welding positions and permit relative movement of these portions so that the portion 51 will have its large contacting surface lying flush with the part 32.

A switch 55, having a movable control member 56, is supported by a bracket 57 integral with the portion 12 of the frame 10. The switch 55 is of the normally open type adapted to be closed through downward pressure on the member 56, to cause closing of the welding circuit (not shown). A spring pressed plunger 58, carried by an arm 59 mounted upon the rack 15, serves as means to actuate the switch through its control member 56 after the electrodes have been moved into engagement with the assembly of parts they are to weld.

The bracket 45 previously described as serving as a connection between the conductor 43 and the lead 46, is mounted as at 60 upon the frame 10 and extends forwardly to a position as indicated at 61, where clamping means 62 is provided for the mounting of a table 63. The table 63 serves as a support for the parts of the assembly while being positioned for the welding operation. It will be noted that the part 32 extends around the ends of the part 33 and it is important that these parts, particularly the metal ones, be free of the table during the welding operation. To accomplish this purpose and to accomplish still another purpose of balancing the parts so that the movement of the electrodes by a common means will cause application of equal pressures to the parts at each electrode, this means consists of a semi-spherical element 65 mounted upon the table 63 at a position midway between the center lines of the electrodes.

Considering now the operation of the welding apparatus, let it be assumed that the head 14 with the structures it supports, including the electrodes 22 and 36, are in their upward positions and that the switch 55 is open. The assembly including the parts 32 and 33 may then be placed upon the table 63 over the element 65 and beneath the electrodes 22 and 36. The part of lead 31 which is to be included in the assembly, may be brought into position beneath the electrode 22. After this has been accomplished, the operator may actuate the head 14 through the aid of the handle 18, the pinion 16 and the rack 15, to cause simultaneous downward movement of the electrodes into the position shown in Fig. 1. During this downward movement of the electrodes, the structure including the parts 32 and 33 may engage the table at one end or the other, but as the electrodes are moved into position the high portion of this assembly will be engaged by one or the other of the electrodes, moving the parts into positions parallel with the table and out of contact therewith. In the construction of the electrodes, one electrode, for example electrode 22, is purposely made shorter in length than the other electrode to compensate for the thickness of the added part it engages. It will be apparent that during the downward movement of the electrodes the portion 51 may not, at the beginning of its downward travel, be positioned so that its contacting surface will be parallel with the part 32. However, through the universal connection between the portions 51 and 38, the contacting surface of the former will find its parallel position with the adjacent surface of the part 32.

The switch arrangement may be such that the plunger 58 will cause closing of the switch after the electrodes have been moved into position and the desired pressure applied through the electrodes to the parts being welded. Upon closing of the switch and the completion of the welding circuit, the welding energy will pass through the electrode 22, the part 31, into the part 32, over to the electrode structure 36, and back through the conductor 43 and its associated lead 46. The parts 31 and 32 are thus welded together and after a sufficient length of time has lapsed for the completion of this weld, the electrodes, through the movement of the head, may be raised from the welded parts, completing one welding operation.

Another specie of the invention is illustrated in Fig. 3. The structure illustrated in this figure is identical with that illustrated in Figs. 1 and 2 with the exception that an electrode 70 is of a solid structure similar to its companion electrode 71 and the electrode 22. A table 72 and a balancing element 73 support an assembly including a metal part 74 and a non-conductive part 75, the former of which is to be welded to a metallic part 76. With this arrangement the electrodes which are connected through an arm 77 but insulated from each other by a bushing 78, are supported by a common means, such as the head 14, the element 73 causing equalization of the pressure upon the parts to be welded at the electrodes. It will thus be apparent through this structure that an assembly, including metallic parts to be welded together and one or more non-conductive parts prohibiting the passage of a welding current in a straight line through the metallic parts, may be welded through the engagement of electrodes upon a common side of the assembly with the assurance that uniform pressures will be applied at both the electrodes.

Although specific improvements of the invention have been shown and described, it will be understood that they are but illustrative and that various modifications may be made therein without departing from the scope and spirit of this invention as defined by the appended claims.

What is claimed is:

1. A welding apparatus comprising a work engaging electrode member having a concaved recess therein disposed opposite the work engaging surface thereof, a supporting electrode member having a rounded end freely movable in the said recess, means loosely connecting the members for free movement of the recessed member relative to the supporting member and a surface of a part to be welded to another part, and an electrode adapted to engage the other part.

2. A welding apparatus comprising an electrode having normally spaced leading and following members, the former having a flat work engaging surface, means to support the members for movement of the leading member free of engagement with the following member during movement of both members toward a surface of a part to be welded to another part for engagement of the said surfaces prior to engagement of the members, and an electrode adapted to engage the other part.

3. A welding apparatus comprising an electrode having normally spaced leading and following members, the former having a flat work engaging surface, means to support the following member for movement relative to a surface of a part to be welded to another part, means carried by the following member to support the leading member free of engagement with the following member during movement of both members toward the surface of the first part for engagement of the said surfaces prior to the engagement of the members, and an electrode adapted to engage the other part.

4. A welding apparatus comprising an electrode having normally spaced leading and following members, the former having a flat work engaging surface, a second electrode movable relative to a part to be welded to a surface of another part and having an arm, means carried by the said arm to support the following member for movement relative to the surface of the second part, and means carried by the following member to support the leading member free of engagement with the following member during movement of both members toward the surface of the first part for engagement of the said surfaces prior to the engagement of the members.

RAYMOND E. POWELL.